(12) United States Patent
Kärkkäinen et al.

(10) Patent No.: US 11,050,633 B2
(45) Date of Patent: Jun. 29, 2021

(54) SYSTEM AND METHOD FOR CREATING GROUP NETWORKS BETWEEN NETWORK DEVICES

(71) Applicant: Gurulogic Microsystems Oy, Turku (FI)

(72) Inventors: Tuomas Kärkkäinen, Turku (FI); Mikko Sahlbom, Pernio (FI)

(73) Assignee: Gurulogic Microsystems Oy, Turku (FI)

(*) Notice: Subject to any disclaimer, the term of this patent is extended or adjusted under 35 U.S.C. 154(b) by 0 days.

(21) Appl. No.: 17/044,434

(22) PCT Filed: Apr. 18, 2019

(86) PCT No.: PCT/EP2019/060114
§ 371 (c)(1),
(2) Date: Oct. 1, 2020

(87) PCT Pub. No.: WO2019/202087
PCT Pub. Date: Oct. 24, 2019

(65) Prior Publication Data
US 2021/0058300 A1    Feb. 25, 2021

(30) Foreign Application Priority Data

Apr. 18, 2018  (GB) ..................... 1806322

(51) Int. Cl.
*H04L 12/24*    (2006.01)
*H04L 29/12*    (2006.01)
(Continued)

(52) U.S. Cl.
CPC .......... *H04L 41/12* (2013.01); *H04L 41/0806* (2013.01); *H04L 41/0886* (2013.01);
(Continued)

(58) Field of Classification Search
CPC ... H04L 12/66; H04L 29/06612–06625; H04L 29/08315–08324;
(Continued)

(56) References Cited

U.S. PATENT DOCUMENTS 5,751,967 A    5/1998  Raab et al.
6,532,217 B1 * 3/2003  Alkhatib ................. H04L 29/06
                                                        370/252
(Continued)

FOREIGN PATENT DOCUMENTS

EP    1885082 A1    2/2008
EP    2439883 A1    4/2012
(Continued)

OTHER PUBLICATIONS

GB Intellectual Property Office, Combined Search and Examination Report under Sections 17 and 18(3), application No. GB 1806322.2, dated Jun. 15, 2018, 8 pages.
(Continued)

*Primary Examiner* — Brendan Y Higa
(74) *Attorney, Agent, or Firm* — Ziegler IP Law Group, LLC

(57) ABSTRACT

A system for creating one or more group networks between network devices belonging to one or more local networks. Group network devices, dynamically installed at the local networks, are employed to discover network devices connected to their corresponding local networks. Information indicative of a plurality of network devices discovered by the group network devices or selected by a user from amongst the discovered network devices for creation of a group network is received. The plurality of network devices are assigned to the group network, and defined as members of the group network. The group network devices are employed to automatically perform network configurations
(Continued)

for the plurality of network devices, regardless of whether the members of the group network are connected to a same physical local network or to different geographically-separated physical local networks. The group network so created enables the members of the group network to communicate and interoperate with each other in their native protocols. The given group network supports different types of transmission paths and/or different transmission protocols defined by the transmission paths.

26 Claims, 7 Drawing Sheets

(51) Int. Cl.
    *H04L 29/06*     (2006.01)
    *H04L 12/751*     (2013.01)

(52) U.S. Cl.
    CPC .......... *H04L 41/0893* (2013.01); *H04L 41/22* (2013.01); *H04L 45/02* (2013.01); *H04L 61/2015* (2013.01); *H04L 61/2069* (2013.01); *H04L 61/6068* (2013.01); *H04L 61/6095* (2013.01); *H04L 63/0428* (2013.01)

(58) Field of Classification Search
    CPC ....... H04L 29/08387–08441; H04L 29/12933; H04L 41/08–0809; H04L 41/0876–0893; H04L 41/12; H04L 41/22; H04L 45/02; H04L 45/04; H04L 61/20–2015; H04L 61/2061–2076; H04L 61/6068; H04L 61/6095; H04L 63/0272–029; H04L 65/102–104; H04L 67/1042–1044; H04L 67/1059–1072; H04L 12/4641

See application file for complete search history.

(56) References Cited

U.S. PATENT DOCUMENTS

| | | | |
|---|---|---|---|
| 8,484,322 B2* | 7/2013 | Ogawa | H04L 29/12207 709/221 |
| 9,118,495 B1 | 8/2015 | Hankins et al. | |
| 2003/0120766 A1* | 6/2003 | Ishiyama | H04L 29/12273 709/223 |
| 2003/0163583 A1* | 8/2003 | Tarr | H04L 29/12113 709/245 |
| 2004/0037295 A1 | 2/2004 | Tanaka et al. | |
| 2004/0236845 A1* | 11/2004 | Murakami | H04L 12/462 709/222 |
| 2005/0047348 A1* | 3/2005 | Suzuki | H04L 61/6059 370/252 |
| 2005/0198049 A1* | 9/2005 | Ho | H04L 41/12 |
| 2007/0195781 A1* | 8/2007 | Yuki | H04L 29/12113 370/392 |
| 2008/0005344 A1* | 1/2008 | Ford | H04L 29/12283 709/230 |
| 2009/0210075 A1 | 8/2009 | Moriwaki | |
| 2010/0017497 A1 | 1/2010 | Brown et al. | |
| 2013/0182712 A1 | 7/2013 | Aguayo et al. | |
| 2016/0226732 A1 | 8/2016 | Kim et al. | |
| 2018/0083917 A1* | 3/2018 | Xu | H04L 61/2038 |

FOREIGN PATENT DOCUMENTS

| | | |
|---|---|---|
| JP | 4580423 B2 | 11/2010 |
| JP | 2016518636 A | 6/2016 |
| WO | 0078004 A2 | 12/2000 |
| WO | 2006088791 A2 | 8/2006 |
| WO | 2014131021 A2 | 8/2014 |

OTHER PUBLICATIONS

GB Intellectual Property Office, Examination Report under Section 18(3) Application No. GB 1806322.2, dated Oct. 22, 2018, 2 pages.
GB Intellectual Property Office, Examination Report under Section 18(3), Application No. GB1806322.2, dated Feb. 14, 2019, 3 pages.
GB Intellectual Property Office, Examination Report under Section 18(3), Application No. GB1806322.2, dated Jun. 17, 2019, 3 pages.
GB Intellectual Property Office, Intention to Grant under Section 18 (4), Application No. GB 1806322.2, dated Feb. 18, 2020, 2 pages.
GB Intellectual Property Office, Notification of Grant, Application No. GB 1806322.2, dated Mar. 17, 2020, 2 pages.
International Preliminary Report on Patentability, application No. PCT/EP2019/060114, dated Jul. 6, 2020, 7 pages.
International Search Report and Written Opinion, Application No. PCT/EP2019/050114, dated Jul. 12, 2019, 14 pages.
Liu Kecheng et al "Develipment of Mobile Ad-hoc Networks over Wi-Fi Direct with off-the-shelf Android phones", 2016 IEEE International Conference on Communications (ICC), IEEE, May 22, 2016, DOI: 10.1109/ICC.2016.751190, retrieved on Jul. 12, 2016, 6 pages.
Japan Patent Office, Notification of ground of rejection, application No. 2020-546122, dated Apr. 15, 2021, 10 pages. (English Translation Attached, 12 pages).

* cited by examiner

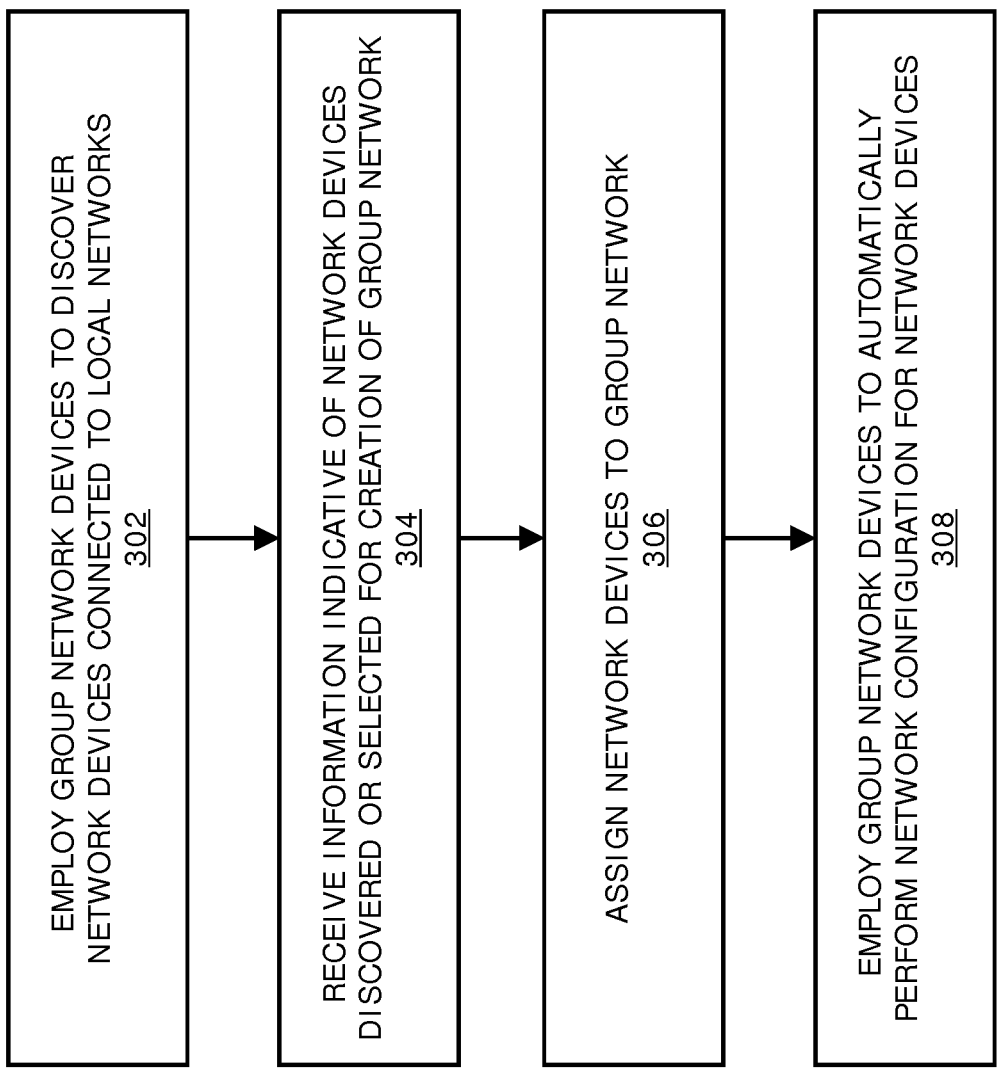

SYSTEM AND METHOD FOR CREATING GROUP NETWORKS BETWEEN NETWORK DEVICES

TECHNICAL FIELD

The present disclosure relates to systems for creating one or more group networks between network devices belonging to one or more local networks. Moreover, the present disclosure is concerned with methods of creating one or more group networks between network devices belonging to one or more local networks. Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods.

BACKGROUND

Traditionally, only network devices physically connected to a same local network can communicate with each other. In order to establish connectivity between remote network devices, users are required to understand technical concepts related to networking.

Conventionally, mobile operators offer certain services, for example, such as Virtual Private Network (VPN) using Multi-Protocol Label Switching (MPLS), to consumers and companies to enable them to communicate with remote network devices. However, these services are static on the physical layer (OSI L1), and employ static manual configuration. In other words, these services require various kinds of network configuration to be performed by a technical expert. As a result, these conventional services are not cost efficient, considering working hours of the technical expert and constant maintenance costs required.

Moreover, there exist other conventional techniques for establishing group communication, for example, such as broadcast, multicast, geocast, and similar. However, these conventional techniques require certain applications to support group communication, and are not easy to use, as group communication is restricted to work only on special network addresses.

In light of the foregoing, there arises a contemporary need for a group communication system that is easier to use, as compared to the aforementioned conventional techniques.

In a published EP patent document EP 2439883 A1 (Hitachi Ltd.; "Virtual Network and Management Method of Virtual Network"), there is described a virtual network system that enables multiple users to share a network and to configure logical networks independent of each other. The system includes multiple communication systems for communication with a user, multiple physical network management servers that manage multiple physical networks including multiple routers, and a virtual network management server that manages a virtual network connecting the communication systems with each other through the physical networks. The virtual network management server acquires physical network configuration information, and generates management information in order to manage the physical networks as one abstraction network. The virtual network management server configures the abstraction network by transmitting the generated management information to each of the physical network management servers and the routers.

In a published WIPO patent document WO 2000/078004 A2 (Alcatel Internetworking Inc.; "Policy Based Network Architecture"), there is described a unified policy management system including a central policy server and remotely situated policy enforcers. A central database and policy enforcer databases storing policy settings are configured as Lightweight Directory Access Protocol (LDAP) databases adhering to a hierarchical object oriented structure. Each policy enforcer collects and transmits health and status information in a predefined log format and transmits it to the policy server. The system also provides dynamically routed VPNs, wherein VPN membership lists are automatically created and shared with the member policy enforcers. Updates to such membership lists are also automatically transferred to remote VPN clients.

In a published United States patent document U.S. Pat. No. 5,751,967 A (Bay Networks Group Inc.; "Method and Apparatus for Automatically Configuring a Network Device to Support a Virtual Network"), there is described a networking system comprising a switching device and a plurality of end-stations interconnected with the switching device in a topology. A configuration device is included having a configuration modification detection circuit for detecting the modification of the topology. A configuration policy maintenance circuit is provided for storing policies related to reconfiguring the switching device upon the modification of the topology. A policy evaluation circuit is provided for determining which end-station and ports are grouped together upon the detection of the modification of the topology. Virtual local area networks may be created/extended/deleted during the reconfiguration to provide networking services to the end-station.

In a published United States patent document US 2010/017497 A1 (International Business Machines Corp.; "Network System with Initiator SubNetwork Communication to Target Subnetwork Communication Including Fibre Channel Over Ethernet to Fibre Channel Over Internet Protocol Conversion"), there is described a network system for supporting multiple network communication protocols. There is disclosed an Ethernet component gateway in a Fibre Channel over Ethernet (FCoE) initiator system that converts FCoE data packets from host devices to Fibre Channel over Internet Protocol (FCIP) data packets for transmission to a Storage Area Network (SAN) target system. The SAN target system may be provided with a target Fibre Channel (FC) storage device and a SAN component gateway. The SAN component gateway converts FCIP data packets to SAN data packets for use by the target FC storage device. The SAN data packets may be either FC protocol data packets or FCoE protocol data packets. The SAN target system may provide for discovery of target FC storage device adapter information.

SUMMARY

The present disclosure seeks to provide an improved system for creating a group network between network devices belonging to one or more local networks.

Moreover, the present disclosure seeks to provide an improved method of creating a group network between network devices belonging to one or more local networks.

A further aim of the present disclosure is to at least partially overcome at least some of the problems of the prior art, as described in the foregoing.

In a first aspect, embodiments of the present disclosure provide a system for creating one or more group networks between network devices belonging to one or more local networks, characterized in that the system comprises a server arrangement that is communicably coupled to one or more group network devices associated with the one or more local networks, each local network having its own group network device, wherein a given group network device is dynamically installed at a given local network, and wherein the server arrangement is configured to:

(i) employ the one or more group network devices to discover network devices connected to their corresponding local networks;
(ii) receive information indicative of a plurality of network devices discovered by the one or more group network devices or selected by a user from amongst the discovered network devices for creation of a given group network;
(iii) assign the plurality of network devices to the given group network, and define the plurality of network devices as members of the given group network; and
(iv) employ the one or more group network devices to automatically perform network configurations for the plurality of network devices, the members of the given group network being connected to a same physical local network or to different geographically-separated physical local networks, thereby creating the given group network for enabling the members of the given group network to communicate and interoperate with each other in their native protocols, wherein the given group network supports different types of transmission paths and/or different transmission protocols defined by the transmission paths, further wherein the given group network device is configured to:

calculate Internet Protocol (IP) network or subnetwork address configuration based upon a total number of network devices discovered on all physical segments of its local network that belong to the given group network;
assign IP addresses, subnet masks and a gateway to the network devices, based upon the calculated IP network or subnetwork address configuration; and
configure the network devices using their assigned IP addresses, subnet masks and gateway.

Embodiments of the present disclosure are of advantage in that the aforementioned system allows the user to create and manage multiple group networks, without requiring the user to understand any technical network-related issues, as the system, in operation, automatically performs all network configurations and operations.

In a second aspect, embodiments of the present disclosure provide method of creating one or more group networks between network devices belonging to one or more local networks, characterized in that the method is implemented via a system comprising a server arrangement that is communicably coupled to one or more group network devices associated with the one or more local networks, each local network having its own group network device, wherein a given group network device is dynamically installed at a given local network, and wherein the method comprises:

(i) employing the one or more group network devices to discover network devices connected to their corresponding local networks;
(ii) receiving information indicative of a plurality of network devices discovered by the one or more group network devices or selected by a user from amongst the discovered network devices for creation of a given group network;
(iii) assigning the plurality of network devices to the given group network, and defining the plurality of network devices as members of the given group network; and
(iv) employing the one or more group network devices to automatically perform network configurations for the plurality of network devices, the members of the given group network being connected to a same physical local network or to different geographically-separated physical local networks, thereby creating the given group network for enabling the members of the given group network to communicate and interoperate with each other in their native protocols, wherein the given group network supports different types of transmission paths and/or different transmission protocols defined by the transmission paths, further wherein the method further comprises:
calculating Internet Protocol (IP) network or subnetwork address configuration based upon a total number of network devices discovered on all physical segments of its local network that belong to the given group network;
assigning IP addresses, subnet masks and a gateway to the network devices, based upon the calculated IP network or subnetwork address configuration; and
configuring the network devices using their assigned IP addresses, subnet masks and gateway.

In a third aspect, embodiments of the present disclosure provide a computer program product comprising a non-transitory (namely, non-transient) computer-readable storage medium having computer-readable instructions stored thereon, the computer-readable instructions being executable by a computerized device comprising processing hardware to execute the aforementioned method pursuant to the aforementioned second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 3 is a flow chart depicting steps of a method of creating a group network between network devices belonging to one or more local networks, in accordance with an embodiment of the present disclosure.

Figure 1A:
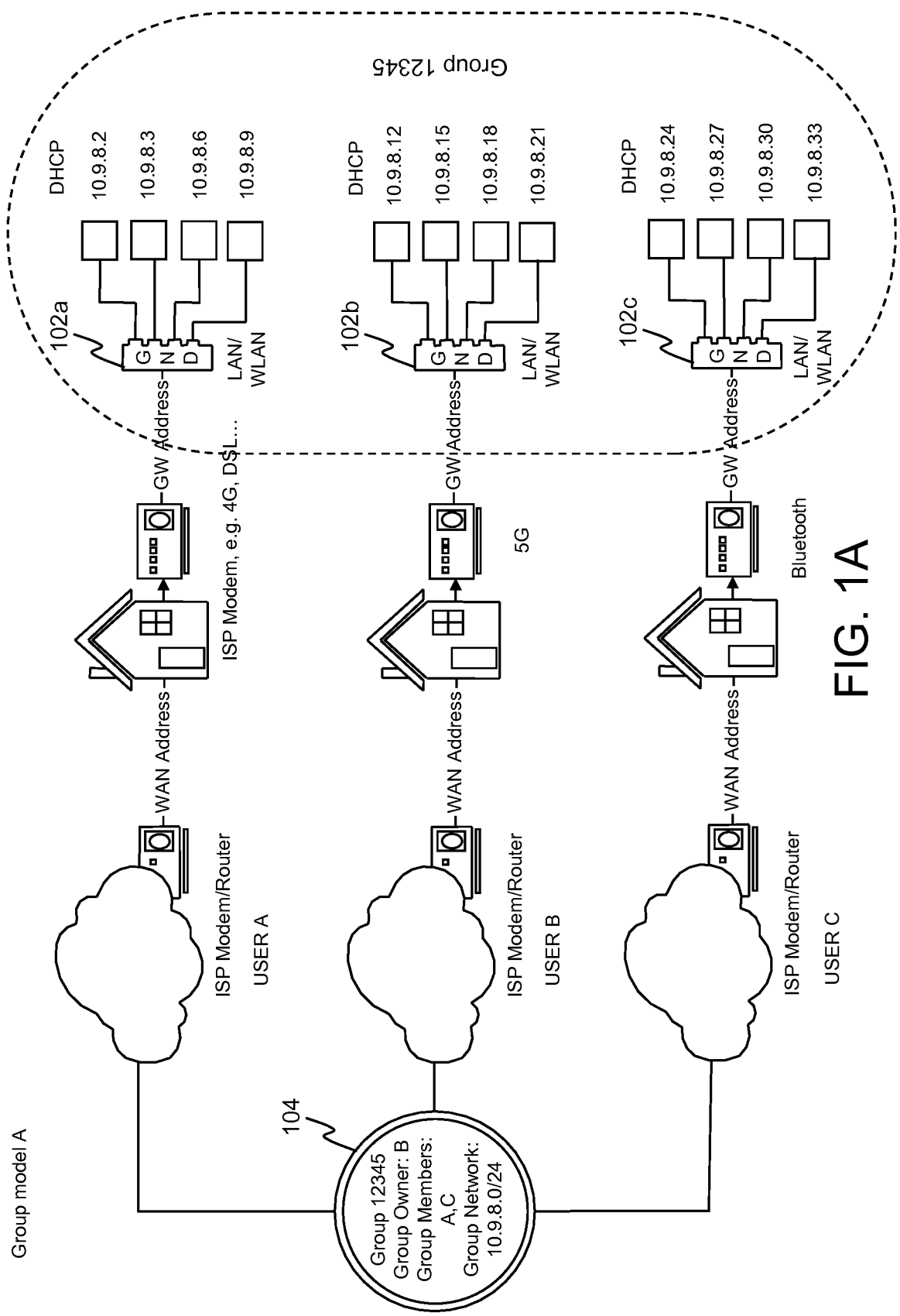
FIGS. 1A and 1B are schematic illustrations of a network environment where a system for creating a group network between network devices belonging to one or more local networks can be implemented, according to an embodiment of the present disclosure.

In the accompanying diagrams, an underlined number is employed to represent an item over which the underlined number is positioned or an item to which the underlined number is adjacent. A non-underlined number relates to an item identified by a line linking the non-underlined number to the item.

DETAILED DESCRIPTION OF EMBODIMENTS

In the following detailed description, illustrative embodiments of the present disclosure and ways in which they can be implemented are elucidated. Although some modes of carrying out the present disclosure are described, those skilled in the art would recognize that other embodiments for carrying out or practising the present disclosure are also possible.

In a first aspect, embodiments of the present disclosure provide a system for creating one or more group networks between network devices belonging to one or more local networks, characterized in that the system comprises a server arrangement that is communicably coupled to one or more group network devices associated with the one or more local networks, each local network having its own group network device, wherein a given group network device is dynamically installed at a given local network, and wherein the server arrangement is configured to:
(i) employ the one or more group network devices to discover network devices connected to their corresponding local networks;
(ii) receive information indicative of a plurality of network devices discovered by the one or more group network devices or selected by a user from amongst the discovered network devices for creation of a given group network;
(iii) assign the plurality of network devices to the given group network, and define the plurality of network devices as members of the given group network; and
(iv) employ the one or more group network devices to automatically perform network configurations for the plurality of network devices, the members of the given group network being connected to a same physical local network or to different geographically-separated physical local networks, thereby creating the given group network for enabling the members of the given group network to communicate and interoperate with each other in their native protocols, wherein the given group network supports different types of transmission paths and/or different transmission protocols defined by the transmission paths, further wherein the given group network device is configured to:
  calculate Internet Protocol (IP) network or subnetwork address configuration based upon a total number of network devices discovered on all physical segments of its local network that belong to the given group network;
  assign IP addresses, subnet masks and a gateway to the network devices, based upon the calculated IP network or subnetwork address configuration; and
  configure the network devices using their assigned IP addresses, subnet masks and gateway.

Pursuant to embodiments of the present disclosure, the system is automated to dynamically connect de-centralized network devices that have no immediate physical connection. The user does not require to manually set up multiple Virtual Private Networks (VPNs), as the given group network is automatically and dynamically configured by the aforementioned system.

The aforementioned system allows the user to create and manage multiple group networks, without requiring the user to understand any technical network-related issues, for example, such as wired and/or wireless network device configurations implemented in these group networks, network addresses, access control and so on. The aforementioned system, in operation, automatically performs all network configurations and operations.

Moreover, optionally, the server arrangement is configured to provide the user with an interactive user interface to enable the user to select the plurality of network devices from amongst the discovered network devices. This is potentially advantageous as such an interactive user interface is user friendly, and easy to use even for non-technical users.

Optionally, the interactive user interface is a graphical user interface. Optionally, the interactive user interface allows the user to create and manage multiple group networks of network devices, with the aid of graphically oriented illustrations and step-by-step wizard dialogs.

Optionally, the interactive user interface is implemented by way of a software application (provided by the server arrangement or a trusted third party) that is downloaded and installed at a user device associated with the user. Alternatively, optionally, the interactive user interface is implemented by way of a web-based service (provided by the server arrangement) that is accessible via a browser of the user device.

Moreover, optionally, the given group network is created by implementing a virtual data link layer (OSI L2) over an existing physical layer (OSI L1). In other words, the given group network is created as a virtual network within a physical network, wherein the network devices of the given group network can communicate with each other, regardless of their geographical location, as though they were connected to a same physical network infrastructure.

Pursuant to embodiments of the present disclosure, the group network devices of the given group network are able to identify each other and to establish direct network connections, regardless of the data link layer or the network layer used. Beneficially, the group network devices are able to establish such direct network connections, without requiring any modification to software used by these group network devices. More beneficially, the group network devices are capable of establishing the direct network connections without a need to communicate data via the server arrangement.

Such direct network connections are enabled by the transmission paths between the group network devices. As an example, a transmission path utilizing an Ipv6 network allows the group network devices to communicate with each other without relaying through the server arrangement, when each of the group network devices has its own Ipv6 address. In such a case, the server arrangement is configured to:
  inform each of the group network devices about Ipv6 addresses of others of the group network devices,
  help in hole punching, and
  deliver network configuration information to the group network devices for creating the given group network.

It will be appreciated that there can be direct network connections between network devices belonging to a same local network; however, there cannot be direct network connections between network devices belonging to different local networks. Once the direct network connections are formed between the group network devices, all the network devices belonging to the given group network are able to communicate with each other, via the group network devices.

Optionally, these direct network connections are implemented via IPv6 type of Internet Protocol (IP) packets. This is particularly beneficial because there is no need to perform Network Address Translation (NAT) for such packets. Optionally, in this regard, the IP packets are synchronized.

Moreover, optionally, the one or more group network devices are configured to process the IP packets to enable the direct network connections. Beneficially, these direct network connections enable the given group network to operate in a distributed and de-centralized manner.

It will be appreciated that the network devices can only detect other network devices within the given group network; however, the network devices cannot detect the one or more group network devices, as the one or more group network devices transparently act as a "wire" for the network devices within the given group network. However, from outside the given group network, the one or more group network devices could be detected (namely, be visible) as a network infrastructure device, for example, such as a hub or a router. In other words, the network devices are configured to work on a network or subnetwork related to the given group network on the network layer (OSI L3), while the one or more group network devices are configured to operate on the data link layer (OSI L2); therefore, the network devices cannot detect the one or more group network devices, which operate one layer below the network devices.

It will also be appreciated that following considerations affect how the given group network functions:
1) IP networking and subnetworking determine visibility, namely detectability, of the network devices.
2) The group network devices are configured to allow or prevent data packet transmission of the data link layer (OSI L2), based upon rules defined for access control.
3) The group network devices are also configured to route data packets between different segments of the local networks, based upon routing tables maintained by the group network devices.

Moreover, the given group network is created in a manner that the given group network supports different types of transmission paths and/or different transmission protocols defined by the transmission paths. In this regard, different types of transmission paths available on the physical layer (OSI L1) can be supported by the given group network, thereby enabling network creation between wired and wireless protocols, for example, such as wired Ethernet and wireless Bluetooth® networks. Moreover, different transmission protocols (for example, such as IPv4 and IPv6 protocols) defined by the transmission paths can be supported by the given group network, thereby enabling natural transitioning from an old transmission protocol to a new transmission protocol without any need for simultaneous updating of the physical local networks.

Pursuant to embodiments of the present disclosure, the given group network utilizes the network layer (OSI L3) for facilitating the aforesaid direct network connections. In other words, these direct network connections utilize conventional and existing network infrastructure (for example, routers, hubs and the like).

Optionally, a communication protocol is implemented programmatically from the data link layer (OSI L2) to the application layer (OSI L7). Optionally, in such a case, the server arrangement is configured to utilize the communication protocol to communicate with the group network devices during the creation and/or modification of the given group network. In such a case, the server arrangement is configured to deliver the network configuration information to the group network devices using the communication protocol.

Optionally, in this regard, the server arrangement is implemented as a network node that is configured to provide a programmatically-centralized service to the group network devices for the creation and/or modification of the given group network and other group network(s). In such a case, the group network devices are only programmatically coupled around the network node. Moreover, such a network node could be implemented either as a data communication equipment (for example, such as a modem, hub and the like) or as a data terminal equipment (for example, such as a router, a host computer and the like). Optionally, the network node is implemented as a programmatic hub or a programmatic router. Such a network node may, for example, be implemented as described in a published WIPO patent document WO2019/008130.

Moreover, optionally, the communication protocol is defined based on the Internet protocol. Such a communication protocol utilizes a physical network (for example, such as a wired Ethernet, a wireless WiFi® network, a wireless Li-Fi, or a wireless Bluetooth® connection) to facilitate actual data transmission, wherein the physical network utilizes one or more upper layers of the OSI model. Optionally, in this regard, the physical network is to be created by implementing a transport layer (OSI L4) over an existing network layer (OSI L3). In other words, the physical network utilizes an L4 layer-based interface.

As mentioned earlier, the given group network is created by implementing a virtual data link layer (OSI L2) over an existing physical layer (OSI L1). The virtual data link layer (OSI L2) delivers data frames, for example, such as Ethernet frames. The existing network layer (OSI L3) delivers IP packets, for example, such as Ipv4 packets and Ipv6 packets. The transport layer (OSI L4) concerns the transmission protocols employed, for example, such as Transmission Control Protocol/Internet Protocol (TCP/IP), User Datagram Protocol (UDP) and Internet Control Message Protocol (ICMP).

Optionally, in order to support the application layer (OSI L7), the transport layer (OSI L4), a session layer (OSI L5) and a presentation layer (OSI L6) are supported.

In this way, the aforementioned system facilitates interoperability between different packet-data-based transmission paths, for example, such as Ethernet, Wi-Fi®, Bluetooth® and Li-Fi.

Pursuant to embodiments of the present disclosure, the given group network is also configured to conform to General Data Protection Regulation (GDPR) and to operate data handling and storage in a safe and secure manner by default, without requiring the user to understand information security or any other technical concepts related to data security.

Optionally, in this regard, the one or more group network devices are configured to generate encryption information defining how data produced within the given group network is to be encrypted. Alternatively, optionally, the one or more group network devices are configured to receive the encryption information from the server arrangement or a trusted third party, wherein the encryption information is generated by the server arrangement or the trusted third party.

Optionally, the encryption information is generated when the given group network is created. Optionally, the one or more group network devices are configured to generate the encryption information randomly. Optionally, the one or more group network devices are configured to use an automated function to generate the encryption information.

Optionally, the data produced within the given group network is encrypted via a symmetric encryption algorithm. Optionally, in this regard, the encryption algorithm is a block cipher algorithm (see https://en.wikipedia.org/wiki/Block cipher), for example, such as Advanced Encryption Standard (AES). Alternatively, optionally, the encryption algorithm is a stream cipher algorithm (see https://en.wikipedia.org/wiki/Stream cipher), for example, such as ChaCha20 algorithm.

Optionally, the one or more group network devices are configured to encrypt all data produced within the given group network.

According to an embodiment, the encryption information comprises at least one key to be used to encrypt data to generate encrypted data and/or to decrypt the encrypted data to re-generate the data.

According to another embodiment, the encryption information comprises an index of the at least one key to be used to encrypt data to generate encrypted data and/or to decrypt the encrypted data to re-generate the data. Optionally, in such a case, the at least one key is to be generated by or accessed from a key store using the index. Optionally, the key store is located at each of the one or more group network devices.

Optionally, the key store is provided by the server arrangement or a trusted third party. In one example implementation, the server arrangement or the trusted third party may generate shared secret key(s) for the given group network and provide the shared secret key(s) to the one or more group network devices for storage at their respective key stores.

Moreover, optionally, all data produced within the given group network is protected in respect of an owner of the given group network (hereinafter referred to as the "group owner", for the sake of convenience only), by using a key store associated with the group owner. Throughout the present disclosure, the terms "owner of a group network" and "group owner" refer to a user who created and/or manages the group network.

Optionally, the key store is implemented to store and/or generate encryption keys for the given group network. The encryption keys may, for example, be produced for the given group network by the server arrangement or a trusted third party. Thus, when the one or more group network devices transmit the data to and from the network devices within the given group network, the one or more group network devices, in operation, encrypt the transmitted data using one or more encryption keys that have been produced for the given group network. In this regard, the one or more group network devices are configured to encrypt all the data produced within the given group network, namely from OSI layer 2 frames to OSI layer 3 packets.

In this way, in the given group network, the one or more group network devices are configured to serve the network devices (namely, end-point devices in their respective local networks) belonging to the given group network, whilst protecting the transmitted data using strong encryption for the network devices belonging to the given group network. Therefore, other network devices belonging to other co-existing group networks cannot use or analyze the data transmitted between the network devices of the given group network.

Moreover, optionally, some functionalities of the one or more group network devices are implemented in at least one of the network devices (namely, at least one of the end-point devices served by the one or more group network devices).

Optionally, an encryption/decryption functionality is implemented in a given network device (namely, an end-point device served by a given group network device). In such a case, the given group network device delivers encrypted data (for example, cipher frames) to the given network device, without any need for decrypting it at the given group network device, because the given network device can itself decrypt the encrypted data. Moreover, in such a case, the given network device also encrypts data before delivering it to the given group network device for relaying purposes, namely for relaying the data to other members of the given group network. Optionally, in this regard, the key store is provided to the given network device by the server arrangement or the trusted third party. In other words, the key store is located at the given network device. This enables the given network device to employ the key store to generate or access at least one key for encryption and/or decryption purposes.

More optionally, at the data link layer (OSI L2), data encryption is performed end-point-to-end-point, namely from a source network device to a destination network device. Such end-point-to-end-point data encryption does not require any additional metadata for encrypted IP packets (of either the IPv4 type or the IPv6 type) transmitted between the source network device and the destination network device. In other words, a payload of the encrypted IP packets is the same as a payload of unencrypted IP packets. This potentially results in significant savings in network bandwidth.

As a result, the aforementioned system is suitable for use with conventional network infrastructure devices (for example, routers or hubs), which deliver the encrypted IP packets in a manner that is similar to delivery of unencrypted IP packets. Thus, in operation, the given group network utilizes already existing network infrastructure devices of a given data communication network for delivering the encrypted IP packets. Thus, the aforementioned system yields significant cost savings in maintenance costs, as compared to conventional techniques for data communication, for example, such as VPNs utilizing Multi-Protocol Label Switching (MPLS). Notably, the network capacity of the VPNs is significantly weakened when data is being encrypted.

Moreover, optionally, only the payload of a given IP packet is encrypted, while the metadata is not encrypted. As a result, the given data communication network is capable of handling delivery of the encrypted IP packets, because information provided in the metadata is not encrypted.

Optionally, in order to encrypt the payload of the given IP packet, a chronological sequence number of the given IP packet is used as an index to generate or access an encryption key from the key store.

Optionally, the metadata (namely, header information) comprises information indicative of the transmission protocol being used. Moreover, optionally, the metadata (namely, the header information) includes a hash of a source IP address and/or a destination IP address.

Optionally, the hash is re-computed after the encryption of the payload of the given IP packet. This potentially ensures that the network infrastructure devices of the given data communication network do not reject the encrypted IP packet as corrupted. Additionally, optionally, the hash is re-computed when the encrypted IP packet reaches a router.

Optionally, the metadata (namely, the header information) is compressed using a de-duplication technique. As an example, the de-duplication technique can be implemented as described in a United States patent document U.S. Pat. No. 9,735,805 B2.

Thus, optionally, the one or more group network devices are configured to extend data protection to the given network device of the given group network, if the given network device is capable of using strong encryption. In such a case, the network devices are provided with encryption/decryption keys and/or the key store to be used for encryption/decryption purposes. As a given local network may have one or more network devices, which do not belong to any group network, it is advantageous to extend the data protection to the network devices, so that no unauthorized device (namely, those not belonging to the given group network) on the OSI layer 2 or 3 is able to use and/or analyze the transmitted data.

Optionally, in this regard, the server arrangement is configured to:
employ the one or more group network devices to detect a possibly compromised or malfunctioning network device within the given group network; and
indicate to the user, via the interactive user interface, the possibly compromised or malfunctioning network device, whilst providing an option to the user to remove the possibly compromised or malfunctioning network device from the given group network, thereby enabling the user to isolate other network devices of the given group network from the possibly compromised or malfunctioning network device.

In such a case, when a network device is removed from the given group network, remaining members of the given group network are provided with a new set of encryption keys.

In this way, the aforementioned system can be used to isolate devices within a same physical local network by dynamically re-defining the given group network, without any need for a technical person to implement network connections manually.

Furthermore, according to an embodiment, the server arrangement is configured to:
assign different priorities to different types of data packets for the given group network; and
implement data communication between the members of the given group network based upon the defined priorities.

Optionally, in this regard, data packets having a higher priority are communicated before other data packets.

As an example, such priorities can be implemented in a manner that is analogous to a communication technique described in a UK patent document GB2536299.

Additionally, optionally, the server arrangement is configured to enable, via the interactive user interface, the user to define different types of group profiles for different group networks. As an example, a particular group network can be assigned a gaming profile, wherein IPv4 UDP (OSI L4) data packets are prioritized over IPv4 TCP (OSI L4) data packets.

Pursuant to an embodiment of the present disclosure, a given group network device has an internal or external Dynamic Host Configuration Protocol (DHCP) server. The DHCP server is aware of Media Access Control (MAC) addresses belonging to its local network and the network devices connected to the local network. The given group network device is configured to perform one or more of following operations:

(a) discover network devices connected to its local network (for example, such as a Local Area Network (LAN)) automatically;
(b) calculate IP network or subnetwork address configuration based upon the total number of network devices discovered on all physical segments of its local network (for example, LAN segments) that belong to the given group network;
(c) employ its DHCP server to assign IP addresses, subnet masks and a gateway to the discovered network devices, based upon the calculated IP network or subnetwork address configuration;
(d) employ its DHCP server to automatically configure the discovered network devices using their assigned IP addresses, subnet masks and gateway; and/or
(e) update a routing table maintained for the given group network, based upon the calculated IP network or subnetwork address configuration and/or the assigned IP addresses, subnet masks and gateway.

It will be appreciated that when data is processed in the data link layer (OSI L2), a communication method employed in the data link layer is based on MAC addresses, and not on IP addresses. A MAC address is a unique identifier assigned to a device, namely a unique device ID. Hence, pursuant to the aforementioned operation (a), the given group network device is configured to automatically detect all the network devices connected to its local network, wherein the network devices are identified uniquely and individually by their MAC addresses.

In an alternative implementation, the DHCP server may not be used to configure the network devices. In such a case, during operations similar to the aforementioned operations (c) and (d), other network-related information can be assigned to the discovered network devices, whereby the network devices can be automatically configured using the other network-related information.

Moreover, optionally, with regard to the aforementioned operation (e), the routing table includes IP frames as well as Address Resolution Protocol (ARP) packets of the Ethernet frames; the ARP packets are used to inform which device (namely, identified by its MAC address) has which IP address. This is very unlike in conventional techniques, where ARP packets are not included in routing tables.

Additionally, optionally, the server arrangement is configured to provide the user with information about the assigned IP addresses, subnet masks and gateway. Such information may, for example, be provided via the aforementioned user interface. Optionally, in such a case, the IP addresses, subnet masks and gateway are assigned in a static manner.

It will be appreciated that the given group network device is configured to perform the aforementioned operations repeatedly on a continuous basis, in order to detect changes occurring in its local network (for example, such as new devices connecting to the local network or existing devices disconnecting from the local network).

Likewise, each of the one or more group network devices is configured to perform the aforementioned operations. In this way, the one or more group network devices are employed to facilitate the data transmission between the members of the given group network.

Moreover, optionally, the server arrangement is configured to:
assign unique networking addresses to all the network devices;
automatically create network configuration using the unique networking addresses; and communicate the created network configuration to the one or more group network devices for creating and/or modifying the given group network.

Throughout the present disclosure, the term "local network" generally refers to a LAN or a Wireless LAN (WLAN). Examples of the network devices include, but are not limited to, personal computers, laptops, servers, workstations, smartphones, mobile communication devices, Television (TV) sets and other Internet of Things (IoT) devices.

The term "group network device" has been used to refer to a dedicated hardware, dynamically installed at a given local network, with built-in or installed software that, when executed, causes the group network device to connect to a communication network using wires or wirelessly, and to perform the aforementioned operations. By "dynamically installed", it is meant that a given group network device is not necessarily physically or statically installed at a given local network. In other words, the given group network device is not restricted to a physical location or coupling. It could be a user's mobile phone or other device, for example, such as an Android TV®. As an example, a group network device could be implemented by way of a dedicated network infrastructure device, for example, such as a hub or a router, onto which the aforementioned software is downloaded and installed. As another example, a group network device could be implemented by way of a network-capable device (for example, such as a server, a workstation, a mobile device and similar) onto which the aforementioned software is downloaded and installed.

It will be appreciated that the data can be communicated from one group network device to another group network device or from a given group network device to a proxy server. In other words, the data can be communicated in a peer-to-peer (P2P) manner or relayed via a separate server using Traversal Using Relays around NAT (TURN).

It will be appreciated that a given local network can have more than one group network device that are configured to perform one or more of the aforementioned operations. In other words, each local network has at least one physical device acting as a group network device.

Throughout the present disclosure, the term "server arrangement" has been used to refer to one or more servers that are a part of an infrastructure of a service provider. As an example, the server arrangement could be a part of an infrastructure of an Internet Service Provider (ISP).

Pursuant to an embodiment of the present disclosure, the server arrangement is configured to enable the user to create and manage a plurality of group networks of network devices. The server arrangement is configured to assign a unique group identifier (hereinafter referred to as the "group ID", for the sake of convenience only) to each group network.

Optionally, the aforementioned interactive user interface allows the user to graphically define the plurality of group networks and assign members to each group network.

Optionally, the server arrangement is configured to store network information pertaining to the plurality of group networks and their corresponding members.

Optionally, in this regard, the one or more group network devices are configured to maintain routing tables for the plurality of group networks. Specifically, a given group network device is configured to maintain routing tables for only those group networks to which network devices discovered on its local network belong.

According to an embodiment, the server arrangement acts as a centralized node that stores all group-specific routing tables. Optionally, when acting as the centralized node, the server arrangement is implemented as a router and is configured to transmit the data to only those group network devices that ought to receive the data. This is particularly beneficial when the group network devices cannot form a connection between themselves. An additional advantage of such a centralized node is that unnecessary data transmission between the group network devices belonging to the given group network is avoided. As an example, if a particular group network device belongs to a local network where no network device ought to receive certain data, an unnecessary communication to that particular group network device is avoided.

Optionally, the one or more group network devices are configured to keep a track of the network configuration information pertaining to the discovered network devices, wherein the network configuration information of a given network device comprises at least one of: a MAC address of the given network device, an IP address of the given network device, an Operating System (OS) executing on the given network device, listening service ports used by the given network device. Optionally, in such a case, the one or more group network devices are configured to communicate, to the server arrangement, the network configuration information pertaining to the discovered network devices. Optionally, the server arrangement is configured to provide, for example via the user interface, the user with the network configuration information pertaining to the discovered network devices along with information indicative of group network(s) to which the discovered network devices belong.

In this way, the aforementioned system enables the user to create and manage multiple group networks substantially simultaneously. It will be appreciated that the server arrangement is configured to perform operations that enable the user to create and manage (for example, modify and/or delete) the given group network and other group network(s).

However, once the given group network is created, direct network connections are beneficially formed between the network devices, via the one or more group network devices. Notably, data communication between the network devices of the given group network is only relayed through the one or more group network devices, and not through the server arrangement.

It will be appreciated that network devices belonging to a same local network interact and communicate data directly, without a group network device. Pursuant to embodiments of the present disclosure, network devices belonging to different local networks and being administered by different group network devices interact and communicate data via the group network devices. However, these network devices are unaware of an existence of the group network devices therebetween, and interact with each other as though they are interacting directly. Thus, these network devices are capable of communicating with each other in a manner that is similar to communications between network devices existing physically on a same local network.

According to an embodiment, the server arrangement is configured to:
    enable, via the aforementioned interactive user interface, the user to select, from amongst the plurality of group networks, at least one group network for deletion; and
    delete the at least one group network.

In such a case, the server arrangement is configured to notify group network devices associated with the at least one deleted group network about the deletion of the at least one group network. Optionally, in such a case, the server arrangement and/or the group network devices are configured to perform network reconfiguration taking into account the at least one deleted group network.

Moreover, according to an embodiment, the server arrangement is configured to:
enable, via the interactive user interface, the user to select, from amongst the discovered network devices, at least one network device for addition to the given group network;
assign the at least one network device to the given group network and re-define the members of the given group network, based upon the user's selection; and
employ the one or more group network devices to automatically perform the network reconfiguration for the remaining members of the given group network, thereby modifying the given group network for providing uninterrupted communication between the members of the given group network.

In such a case, the server arrangement is configured to notify the one or more group network devices about the addition of the at least one network device to the given group network. In such a case, the server arrangement and/or the group network devices are configured to perform the network reconfiguration for the given group network.

Furthermore, according to an embodiment, the server arrangement is configured to:
enable, via the interactive user interface, the user to select, from amongst the plurality of network devices of the given group network, at least one network device for removal from the given group network;
remove the at least one network device from the given group network and re-define the members of the given group network, based upon the user's selection; and
employ the one or more group network devices to automatically perform the network reconfiguration for all the members of the given group network, thereby modifying the given group network for providing uninterrupted communication between the members of the given group network.

In such a case, the server arrangement is configured to notify the one or more group network devices about the removal of the at least one network device from the given group network. In such a case, the server arrangement and/or the group network devices are configured to perform the network reconfiguration for the given group network.

Moreover, optionally, a given network device exists in only one group network at a given point of time. Alternatively, optionally, a given network device exists in more than one group network at a given point of time.

Accordingly, pursuant to embodiments of the present disclosure, there are at least two types of group network models from a technical point of view to produce local area network addresses for network devices. It will be appreciated that these group network models do not affect how the aforementioned system works, but offer greater scalability with respect to a physical network environment where the aforementioned system is implemented.

Option 1:

In the first group network model (depicted as a group network model 'A' in FIG. 1A),
(i) all network devices belonging to a same group network share a same network or subnetwork address, irrespective of where these network devices exist physically;
(ii) network devices belonging to a given group network cannot communicate with network devices belonging to other group networks; and
(iii) a given network device can exist only in one group network at a given point of time.

It will be appreciated that this group network model is most suitable for consumers and small companies. An example of a network environment where the first group network model can be implemented has been provided in conjunction with FIG. 1A.

Option 2:

In the second group network model (depicted as a group network model 'B' in FIG. 1B),
(i) network devices belonging to a same group network can use their own private network or subnetwork addresses specific to their own local networks;
(ii) network devices belonging to a given group network can communicate with network devices belonging to other group networks; and
(iii) a given network device can exist in multiple group networks at a given point of time.

It will be appreciated that this group network model is most suitable for companies and large organizations. An example of a network environment where the second group network model can be implemented has been provided in conjunction with FIG. 1B. The second group network model supports multiple connections between the group network devices and the network devices to accommodate the multiple group networks concurrently. Thus, the second group network model facilitates multipoint-to-multipoint connections. Notably, such multipoint-to-multipoint connections are not feasible with MPLS.

In both of these group network models, the network devices must have unique networking addresses on routing tables maintained by the server arrangement, so that network address configuration can be instructed to the group network devices. In the second group network model, the group network devices are configured to automatically perform network address translation (NAT) for incoming and outgoing data packets on the data link layer (OSI L2) and the network layer (OSI L3), if some network devices function on different network or subnetwork than the given group network. As an example, the NAT for the data link layer (OSI L2) is usually performed for ARP type of Ethernet frames, while the NAT for the network layer (OSI L3) is usually performed for IPv4 type of IP packets, where MAC addresses or IP addresses are translated by automatically configured NAT rules.

It will be appreciated that the network devices on an IPv4 network must be configured properly to work. Optionally, in this regard, the server arrangement is configured to provide appropriate configuration information to the group network devices, which then configure these network devices for joining different existing group networks. In this regard, the configuration information comprises IP addresses, subnet masks and a gateway to be used for configuring these network devices.

Subnet Masks:

It is well known that a subnet mask is used to divide an IP address into two parts, wherein one part of the IP address identifies a network device, while another part of the IP address identifies the local network to which the network device belongs.

A subnet mask can be represented as four groups of three-digit numbers that are separated by dots as follows:
DDD.DDD.DDD.DDD A subnet mask is actually a binary value of 32 bits, which have been illustrated as four groups of eight bits each, as follows:

BBBBBBBB.BBBBBBBB.BBBBBBBB.BBBBBBBB

A subnet mask is often represented as a single two-digit number (for example, such as 16, 24 or 32) in combination with the IP address, for example, as follows:

192.168.8.0/24

Hereinabove, the number '24' represents the number of bits that have a bit value '1' (where 1's are closed bits and 0's are open bits), and thus, represents the following subnet mask:

11111111.11111111.11111111.00000000

The same subnet mask can also be represented as:

255.255.255.0

For this subnet mask, a range of valid IP addresses can be calculated using the following formula:

$$(2^N)-2$$

where 'N' represents the number of open bits, while '−2' is used to exclude the first and last IP addresses (namely, those reserved for the subnet address and the broadcast address).

Thus, the range of valid IP addresses in this case would be 254 (=$2^8-2$), namely, from 192.168.8.1 to 192.168.8.254. In such a case, there would be no subnets, but only one local network.

In a second example case, there will now be considered a subnet mask that is represented as follows:

192.168.8.0/16

In this case, the subnet mask is as follows:

11111111.11111111.00000000.00000000

The same subnet mask can also be represented as:

255.255.0.0

For this subnet mask, the range of valid IP addresses would be 65534 (=$2^{16}-2$), namely from 192.168.0.1 to 192.168.255.254.

In a third example case, there will now be considered a subnet mask that is represented as follows:

192.168.8.1/32

In this case, the subnet mask is as follows:

11111111.11111111.11111111.11111111

The same subnet mask can also be represented as:

255.255.255.255

For this subnet mask, the range of valid IP addresses would be −1 (=$2^0-2$), namely only one IP address 192.168.8.1.

IPv4 Address Class and Subnets:

According to the IPv4 specification standard, there are three address classes, namely classes A, B and C.

In class A, eight bits are specified for identifying the local network, while 24 bits are specified for identifying the network device, namely a host, for example, as follows:

NNNNNNNN.HHHHHHHH.HHHHHHHH.HHHHHHHH

In class B, 16 bits are specified for identifying the local network, while 16 bits are specified for identifying the network device, for example, as follows:

NNNNNNNN.NNNNNNNN.HHHHHHHH.HHHHHHHH

In class C, 24 bits are specified for identifying the local network, while eight bits are specified for identifying the network device, for example, as follows:

NNNNNNNN.NNNNNNNN.NNNNNNNN.HHHHHHHH

When defining a subnet, some bits are borrowed from bits identifying the network device (H) and assigned to bits identifying the local network (N), thereby producing multiple subnets/networks.

For illustration purposes only, there will now be considered some examples of class C.

In a first example case, a following subnet mask is considered:

192.168.8.0/24 (11111111.11111111.11111111.00000000)

192.168.8.0 255.255.255.0

The number of networks or subnetworks can be calculated using the following formula:

$$256/(2^N)$$

In the first example case, N=8. Therefore, there is only one network and no subnet. This network can have 254 network devices, which can have a following range of IP addresses:

192.168.8.1 to 192.168.8.254

In a second example case, a following subnet mask is considered:

192.168.8.0/25 (11111111.11111111.11111111.10000000)

192.168.8.0 255.255.255.128

In the second example case, N=7. Therefore, there are two networks (=$256/(2^7)$=256/128). The size of the subnet is 128. Therefore, there can be 126 network devices.

Thus, the network 192.168.8.0 becomes two networks 192.168.8.0 and 192.168.8.128, which can have following ranges of IP address, respectively:

192.168.8.1 to 192.168.8.126
192.168.8.129 to 192.168.8.254

In a third example case, a following subnet mask is considered:

192.168.8.0/26 (11111111.11111111.11111111.11000000)

192.168.8.0 255.255.255.192

In the third example case, N=6. Therefore, there are four networks (=$256/(2^6)$=256/64). The size of the subnet is 64. Therefore, there can be 62 network devices.

Thus, the network 192.168.8.0 becomes four networks 192.168.8.0, 192.168.8.64, 192.168.8.128 and 192.168.8.192, which can have following ranges of IP address, respectively:

192.168.8.1 to 192.168.8.62
192.168.8.65 to 192.168.8.126
192.168.8.129 to 192.168.8.190
192.168.8.193 to 192.168.8.254

It will be appreciated that the above examples have been provided for illustration purposes only. It is well known that IPv6 works differently. A person skilled in the art will recognize many variations, alternatives, and modifications of embodiments of the present disclosure.

Group Network Address

In the context of a LAN, a group network can be considered as a high-level alias to a network or subnetwork. As an example, if a user (for example, such as a LAN owner) defines a single group network, then a single network represented by a group network address NNN.NNN.NNN.0/24 is automatically created and configured for the single group network. If the user defines two group networks, then two networks represented by a group network address NNN.NNN.NNN.0/25 are automatically created and configured for the two group networks. Likewise, if the user defines three or four group networks, then four networks represented by a group network address NNN.NNN.NNN.0/26 are automatically created and configured.

Pursuant to embodiments of the present disclosure, subnets are automatically created and configured, based upon the number of group networks defined by the user and the number of available network devices. Optionally, additional slots are also left when creating the subnets, in order to accommodate addition of new network devices to an existing group. This potentially prevents a need for immediate subnet creation, when new network devices are potentially added to an existing group network.

Pursuant to embodiments of the present disclosure, when the user defines multiple group networks under a same group network device, each group network has its own subnetwork. In such a case, a subnetwork for a given group network is created with a large enough subnetwork address space, such that the subnetwork address space is capable of accommodating all network devices belonging to the given group network.

For illustration purposes only, there will now be considered an example implementation of the aforementioned system using the aforementioned first group network model. There will now be described exemplary detailed steps performed during following processes:

Process 1: an initial setup of a group network, when the user signs-in to a service provided by the server arrangement of the aforementioned system;

Process 2: when the user creates a new group network, using the service;

Process 3: when the user deletes an existing group network, using the service;

Process 4: when the user assigns a new network device to an existing group network, using the service; and Process 5: when the user removes an existing network device from an existing group network, using the service.

Process 1: Initial Setup of Group Network, when User Signs-in to Service

Step 1: A group network device is installed dynamically within a local network (for example, a LAN). The group network device could be connected using wires or wirelessly, to an Internet modem provided by an Internet Service Provider (ISP). The group network device is registered with the service provided by the server arrangement, using a unique group-network-device identification (hereinafter referred to as the "device ID", for the sake of convenience only). The device ID could be, for example, a serial ID or a MAC address of the group network device.

Step 2: The group network device is associated with a given user, who acts as an owner of the group network device (hereinafter referred to as the "GND owner", for the sake of convenience only). Throughout the present disclosure, the terms "owner of a group network device" and "GND owner" refer to a user who owns and/or administers the group network device.

Optionally, in this regard, the given user is provided with a unique user identification (hereinafter referred to as the "user ID", for the sake of convenience only) for accessing the service provided by the server arrangement. Alternatively, optionally, any existing ID of the given user is used as the user ID. The device ID of the group network device is paired to the user ID of the user.

Optionally, the service is provided as a web-based service, and the user signs-in to the service, for example, using his/her user ID. The user then enters the device ID of the group network device at the service, which then pairs the device ID to the user ID. The service then communicates about this pairing to the group network device, which then performs required setup.

Alternatively, optionally, the user downloads and installs a software application (provided by the server arrangement) to his/her user device (for example, such as a laptop, a smartphone and similar), and signs-in to the software application (which connects to the service provided by the server arrangement). The user uses his/her user device to pair his/her user ID to the device ID of the group network device, depending on his/her user device's capabilities. As an example, the user can use any of the following options to read the device ID of the group network device: Near-Field Communication (NFC), Bluetooth®, Wi-Fi®, a camera of the user device, a microphone of the user device, a Light-Emitting-Diode (LED) of the user device, a vibration functionality of the user device, or any other sensor-based functionality of the user device. After the device ID has been read, the software application executing on the user device transmits the device ID to the service, which then pairs the device ID to the user ID. The service then communicates about this pairing to the group network device, which then performs the required setup.

Likewise, the user ID of the user can be paired to device ID's of other group network devices.

It will be appreciated that a given group network device (namely, its device ID) can be paired to more than one user (namely, their user ID's). This allows different users to create and manage their own group networks even when same group network devices are employed at the same time. In other words, pairing between users and group network devices can be a many-to-many relationship.

Moreover, it will be appreciated that a given group network can be created using group network devices owned and/or administered by a same user or different users.

Step 3: The group network device continuously communicates with the server arrangement on a periodic basis or on a random basis. The group network device delivers essential telemetry data to the server arrangement, and receives various operating instructions from the server arrangement.

Step 4: The service creates a default group network for the user and the group network device, and communicates information about the default group network to the group network device.

Step 5: The group network device discovers all network devices connected to the local network, and communicates information about the discovered network devices to the service. The service then assigns the discovered network devices to the default group network, and communicates information about the default group network to the group network device.

This step is repeated on a periodic basis. The group network device detects when previously-connected network device(s) become disconnected from (namely, unavailable on) the local network, and communicates information about such network devices to the service. The service then flags these network devices as offline in the default group network, and communicates this information to the group network device.

It will be appreciated that it is possible that at one point of time, there are multiple network devices connected to the local network, while at another point of time, there is only one network device connected to the local network. Therefore, the group network device could be implemented as a multi-point device or a single-point device, depending upon the number of network devices discovered from time to time. By a "multi-point device", it is meant that the group network device has multiple network devices as end-point devices in its default group network. By a "single-point device", it is meant that the group network device has only one network device as an end-point device in its default group network.

Step 6: The group network device calculates IP network or subnetwork address configuration based upon the total number of network devices discovered on all physical segments of its local network (for example, LAN segments) that belong to the default group network. The group network device then employs its DHCP server to assign IP addresses, subnet masks and a gateway to the discovered network devices, based upon the calculated IP network or subnetwork address configuration, and to automatically configure the discovered network devices using their assigned IP addresses, subnet masks and gateway. The group network device also updates a routing table maintained thereat, based upon the calculated IP network or subnetwork address configuration and/or the assigned IP addresses, subnet masks and gateway.

The step 6 is hereinafter referred to as the step of "automatically performing network configuration", for the sake of convenience only.

Once the steps of the first process are performed, the network devices of the default group network are capable of communicating with each other. It will be appreciated that these network devices are capable of communicating with each other in a manner that is similar to communications between network devices existing physically on a same LAN.

Process 2: When User Creates New Group Network

Step 1: The user defines a new group network, for example, using an interactive user interface provided by the service. The user interface could be provided by the web-based service or the software application.

Step 2: The service creates a new group network.

Step 3: The user selects desired network devices from the default group network (and/or other existing group network(s)) for creation of the new group network. As an example, the user interface may present the default group network and the new group network, and allow the user to move the desired network devices from the default group network to the new group network.

Step 4: The service removes the selected network devices from the default group network (and/or the other existing group network(s)), and assigns the selected network devices to the new group network.

Step 5: The service and/or the group network device automatically perform network reconfiguration for the new group network and the default group network (and/or the other existing group network(s)) from which the selected network devices were removed. It will be appreciated that this step is performed in a manner that is similar to the aforementioned step 6 of the aforementioned process 1.

Process 3: When User Deletes Existing Group Network

Step 1: The user selects an existing group network for deletion, using the interactive user interface.

Step 2: The service removes all the network devices from the selected group network, and assigns the network devices back to the default group network.

Step 3: The service deletes the selected group network.

Step 4: The service and/or the group network device automatically perform network reconfiguration for the deleted group network and the default group network to which the network devices were assigned. It will be appreciated that this step is performed in a manner that is similar to the aforementioned step 6 of the aforementioned process 1.

Process 4: When User Adds New Network Device to Existing Group Network

Step 1: The user selects desired network device(s) from a source group network (namely, the default group network or any other existing group network) for addition to a target group network. As an example, the user interface may present the source group network and the target group network, and allow the user to move the desired network device(s) from the source group network to the target group network.

Step 2: The service removes the selected network device(s) from the source group network, and assigns the selected network device(s) to the target group network.

Step 3: The service and/or the group network device automatically perform network reconfiguration for the source group network and the target group network. It will be appreciated that this step is performed in a manner that is similar to the aforementioned step 6 of the aforementioned process 1.

Process 5: When User Removes Existing Network Device from Existing Group Network Step 1: The user selects desired network device(s) from an existing group network for removal therefrom. As an example, the user interface may present the existing group network and the default group network, and allow the user to move the desired network device(s) from the existing group network to the default group network.

Step 2: The service removes the selected network device(s) from the existing group network, and assigns the selected network device(s) to the default group network.

Step 3: The service and/or the group network device automatically perform network reconfiguration for the existing group network and the default group network. It will be appreciated that this step is performed in a manner that is similar to the aforementioned step 6 of the aforementioned process 1.

It will be appreciated that the aforementioned system can be used for various purposes. The aforementioned system can be used to create a group network of network devices belonging to different geographically-separated physical local networks, thereby enabling the network devices to interact with each other even when they are geographically separated. As an example, the aforementioned system can be implemented to create a common group network of network devices belonging to different business organizations.

In a second aspect, embodiments of the present disclosure provide a method of creating one or more group networks between network devices belonging to one or more local networks, characterized in that the method is implemented via a system comprising a server arrangement that is communicably coupled to one or more group network devices associated with the one or more local networks, each local network having its own group network device, wherein a given group network device is dynamically installed at a given local network, and wherein the method comprises:

(i) employing the one or more group network devices to discover network devices connected to their corresponding local networks;

(ii) receiving information indicative of a plurality of network devices discovered by the one or more group network devices or selected by a user from amongst the discovered network devices for creation of a given group network;

(iii) assigning the plurality of network devices to the given group network, and defining the plurality of network devices as members of the given group network; and (iv) employing the one or more group network devices to automatically perform network configurations for the plurality of network devices, the members of the given group network being connected to a same physical local network or to different geographically-separated physical local networks, thereby creating the given group network for enabling the members of the given group network to communicate and interoperate with each other in their native protocols, wherein the given group network supports different types of transmission paths and/or different transmission protocols defined by the transmission paths,
further wherein the method further comprises:
calculating Internet Protocol (IP) network or subnetwork address configuration based upon a total number of network devices discovered on all physical segments of its local network that belong to the given group network;
assigning IP addresses, subnet masks and a gateway to the network devices, based upon the calculated IP network or subnetwork address configuration; and
configuring the network devices using their assigned IP addresses, subnet masks and gateway.

The method pursuant to embodiments of the present disclosure is implemented via the aforementioned system, as described in the aforementioned first aspect.

Optionally, the method further comprises providing the user with an interactive user interface to enable the user to select the plurality of network devices from amongst the discovered network devices.

Optionally, the method further comprises:
enabling, via the interactive user interface, the user to select, from amongst the discovered network devices, at least one network device for addition to the given group network;
assigning the at least one network device to the given group network and re-defining the members of the given group network, based upon the user's selection; and
employing the one or more group network devices to automatically perform the network reconfiguration for the remaining members of the given group network, thereby modifying the given group network for providing uninterrupted communication between the members of the given group network.

Optionally, the method further comprises:
enabling, via the interactive user interface, the user to select, from amongst the plurality of network devices of the given group network, at least one network device for removal from the given group network;
removing the at least one network device from the given group network and re-defining the members of the given group network, based upon the user's selection; and
employing the one or more group network devices to automatically perform the network reconfiguration for all the members of the given group network, thereby modifying the given group network for providing uninterrupted communication between the members of the given group network.

Optionally, the method further comprises:
assigning unique networking addresses to all the network devices;
automatically creating network configuration using the unique networking addresses; and
communicating the created network configuration to the one or more group network devices for creating and/or modifying the given group network.

Optionally, the method further comprises enabling the user to create and manage a plurality of group networks of network devices. Optionally, in this regard, the method further comprises storing network information pertaining to the plurality of group networks and their corresponding members.

According to an embodiment, the server arrangement acts as a centralized node and is implemented as a router. Optionally, in this regard, the method further comprises:

storing, at the centralized node, all group-specific routing tables; and
transmitting data to only those group network devices that ought to receive the data.

Optionally, the method further comprises configuring the one or more group network devices to encrypt all data produced within the given group network.

Optionally, the method further comprises:
employing the one or more group network devices to detect a possibly compromised or malfunctioning network device within the given group network; and
indicating to the user, via the interactive user interface, the possibly compromised or malfunctioning network device, whilst providing an option to the user to remove the possibly compromised or malfunctioning network device from the given group network, thereby enabling the user to isolate other network devices of the given group network from the possibly compromised or malfunctioning network device.

In a third aspect, embodiments of the present disclosure provide a computer program product comprising a non-transitory computer-readable storage medium having computer-readable instructions stored thereon, the computer-readable instructions being executable by a computerized device comprising processing hardware to execute a method of the aforementioned second aspect.

Optionally, the computer-readable instructions are downloadable from a software application store, for example, from an "App store" to the computerized device.

Next, embodiments of the present disclosure will be described with reference to figures.

Figure 1B:
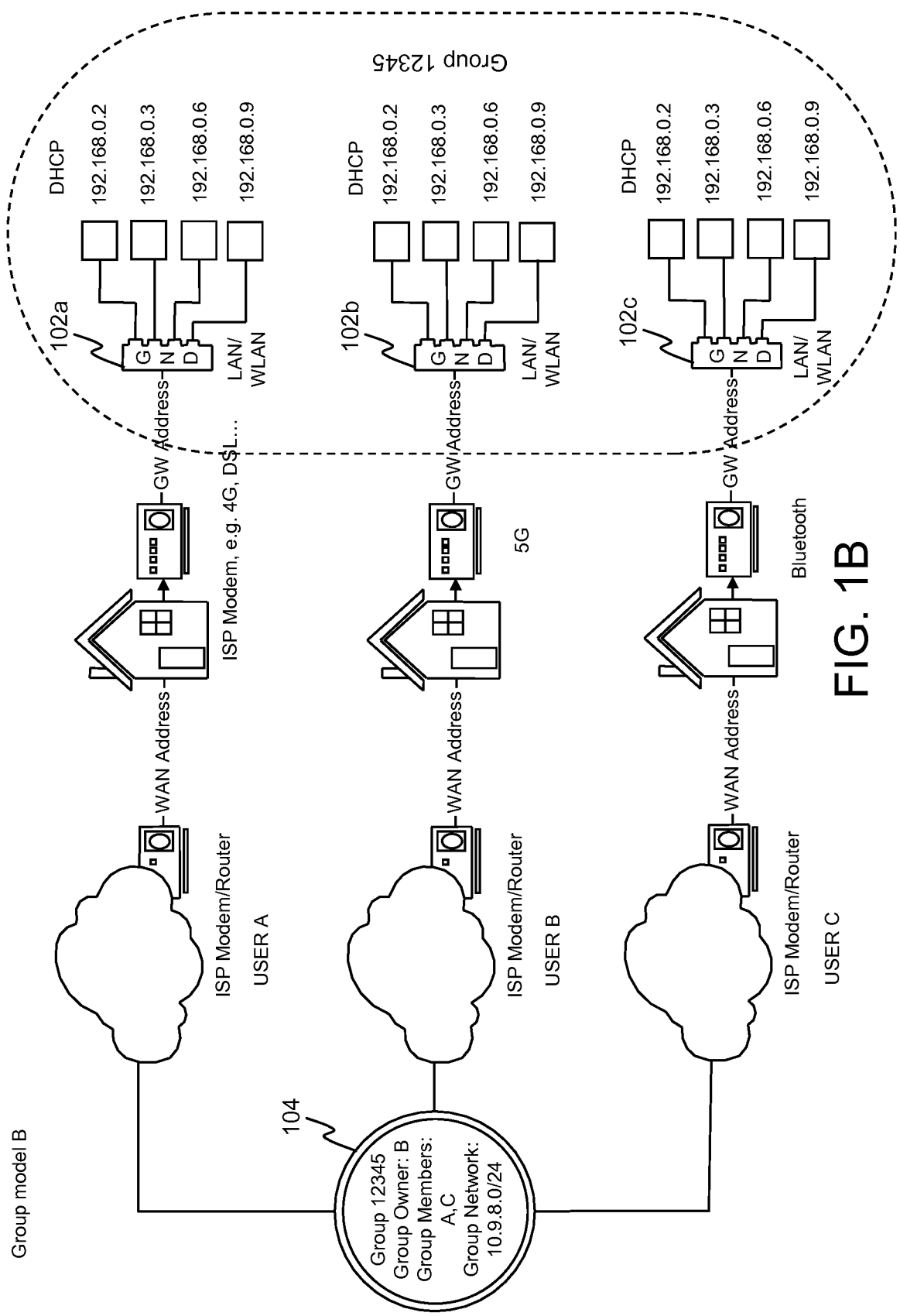

FIGS. 1A and 1B are schematic illustrations of a network environment where a system for managing a group of network devices belonging to one or more local networks has been implemented as per the aforementioned first group network model and the aforementioned second group network model, respectively, according to an embodiment of the present disclosure.

In FIGS. 1A and 1B, there are shown three local networks having four network devices each, and group network devices 102a, 102b and 102c. It will be appreciated that FIGS. 1A and 1B depict the network devices only schematically; these network devices need not be of a same type. Examples of different types of network devices include, but are not limited to, personal computers, laptops, smartphones, smart watches, smart TV sets, set-top boxes, home surveillance cameras and intelligent refrigerators.

For illustration purposes only, the group network device 102a has been shown connected to an Internet modem provided by an Internet Service Provider (ISP) of its local network, the group network device 102b has been shown connected to a fifth generation (5G) telecommunication network, and the group network device 102c has been shown connected to a Bluetooth® network. As mentioned earlier, the aforementioned system facilitates interoperability between different packet-data-based transmission paths, for example, such as Ethernet, Wi-Fi®, Bluetooth®, Li-Fi and so on.

As mentioned earlier, pairing between users and group network devices can be a many-to-many relationship. In FIGS. 1A and 1B, the group network devices 102a and 102c are paired to users A and C, respectively, while all of the group network devices 102a, 102b and 102c are paired to a user B.

It will be appreciated that a given group network can be created using group network devices owned and/or administered by a same user or different users. With reference to FIGS. 1A and 1B, the users A, B and C are GND owners of the group network devices 102a, 102b and 102c, respectively.

The group network devices 102a, 102b and 102c discover network devices connected to their local networks. The group network devices 102a, 102b and 102c inform a service provided by a server arrangement 104 of the system about the discovered network devices. In some implementations, the server arrangement 104 acts as a centralized node and is implemented as a router.

In the illustrated example scenario, the service selects all the discovered network devices in order to create a new default group network that is uniquely identified by its group ID '12345'. Thus, the user B is a group owner of the newly-created default group network '12345', while the users A and C are members of the newly-created default group network '12345'. The group network '12345' is owned and managed by the user B. It will be appreciated that a single user can own more than one group networks.

In the illustrated example scenario, the group network '12345' is assigned a group network address as 10.9.8.0/24.

With reference to FIG. 1A, all network devices belonging to the new group network '12345' share a same network or subnetwork address, irrespective of where these network devices are physically located. In other words, the network devices use a same network address space per group network address, pursuant to the first group network model. Thus, these network devices belong to a common subnetwork.

With reference to FIG. 1B, the network devices use private network or subnetwork addresses corresponding to their local networks. In other words, the network devices use their own private network address space, despite the group network address, pursuant to the second group network model. In such a case, the group network devices 102a, 102b and 102c implement required network address translation (NAT). Pursuant to embodiments of the present disclosure, the group network devices 102a, 102b and 102c perform NAT for both IP packets as well as ARP packets.

Figure 1C:
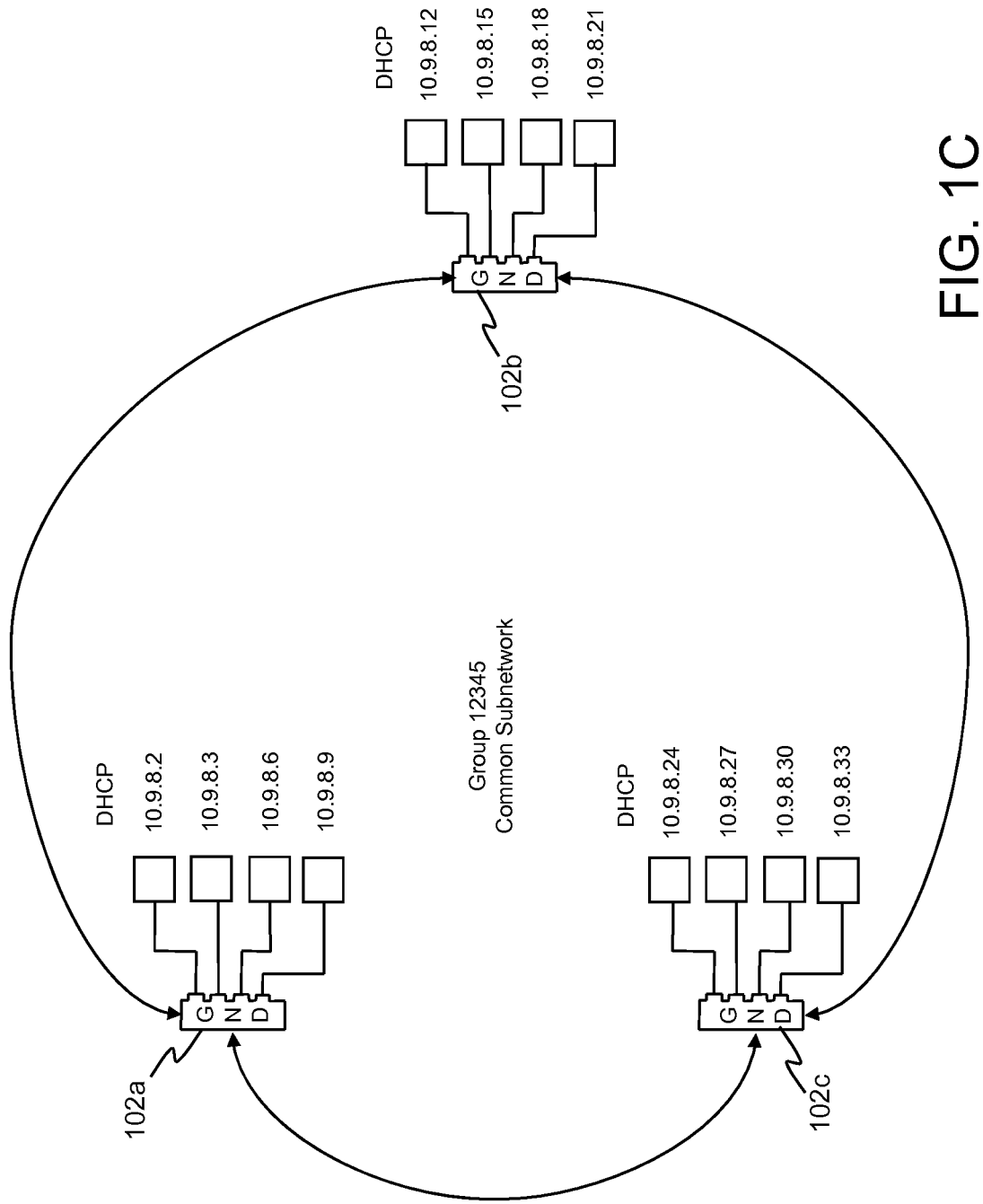
FIGS. 1C and 1D are schematic illustrations of direct network connections formed between group network devices of the group network with respect to a first group network model and a second group network model, respectively, according to an embodiment of the present disclosure.
Figure 1D:
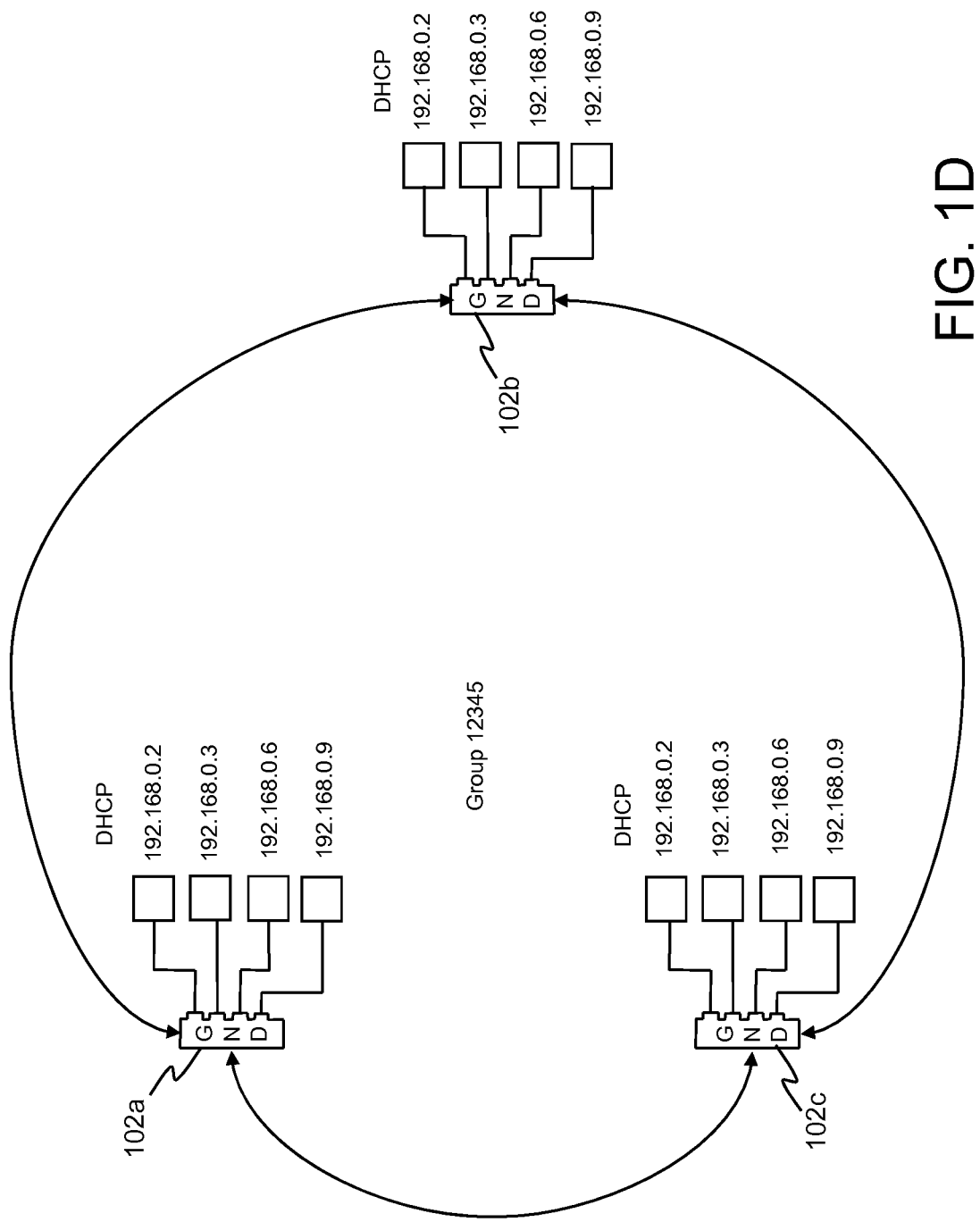

FIGS. 1C and 1D are schematic illustrations of direct network connections formed between the group network devices 102a, 102b and 102c of the group network '12345' with respect to the first group network model and the second group network model, respectively, according to an embodiment of the present disclosure. These direct network connections are formed once the group network '12345' is created.

It will be appreciated that there are direct network connections between network devices belonging to a same local network (not shown, for the sake of simplicity only). However, there are no direct network connections between network devices belonging to different local networks. Once the direct network connections are formed between the group network devices 102a, 102b and 102c, all the network devices belonging to the group network '12345' are able to communicate with each other, via the group network devices 102a, 102b and 102c.

In operation, the group network devices 102a, 102b and 102c communicate with each other directly. In other words, the group network devices 102a, 102b and 102c do not need to communicate via the server arrangement 104. It will be appreciated that the service provided by the server arrangement 104 is beneficially required only during the creation and modification of the group network '12345' (and other group networks). This makes the group network '12345' a decentralized and distributed network.

Moreover, it will be appreciated that the group network devices 102a, 102b and 102c are dynamically installed at their respective local networks. The group network devices 102a, 102b and 102c are not restricted to a physical location or coupling and could be a user's mobile phone or other device, for example, such as an Android TV®.

Figure 1E:
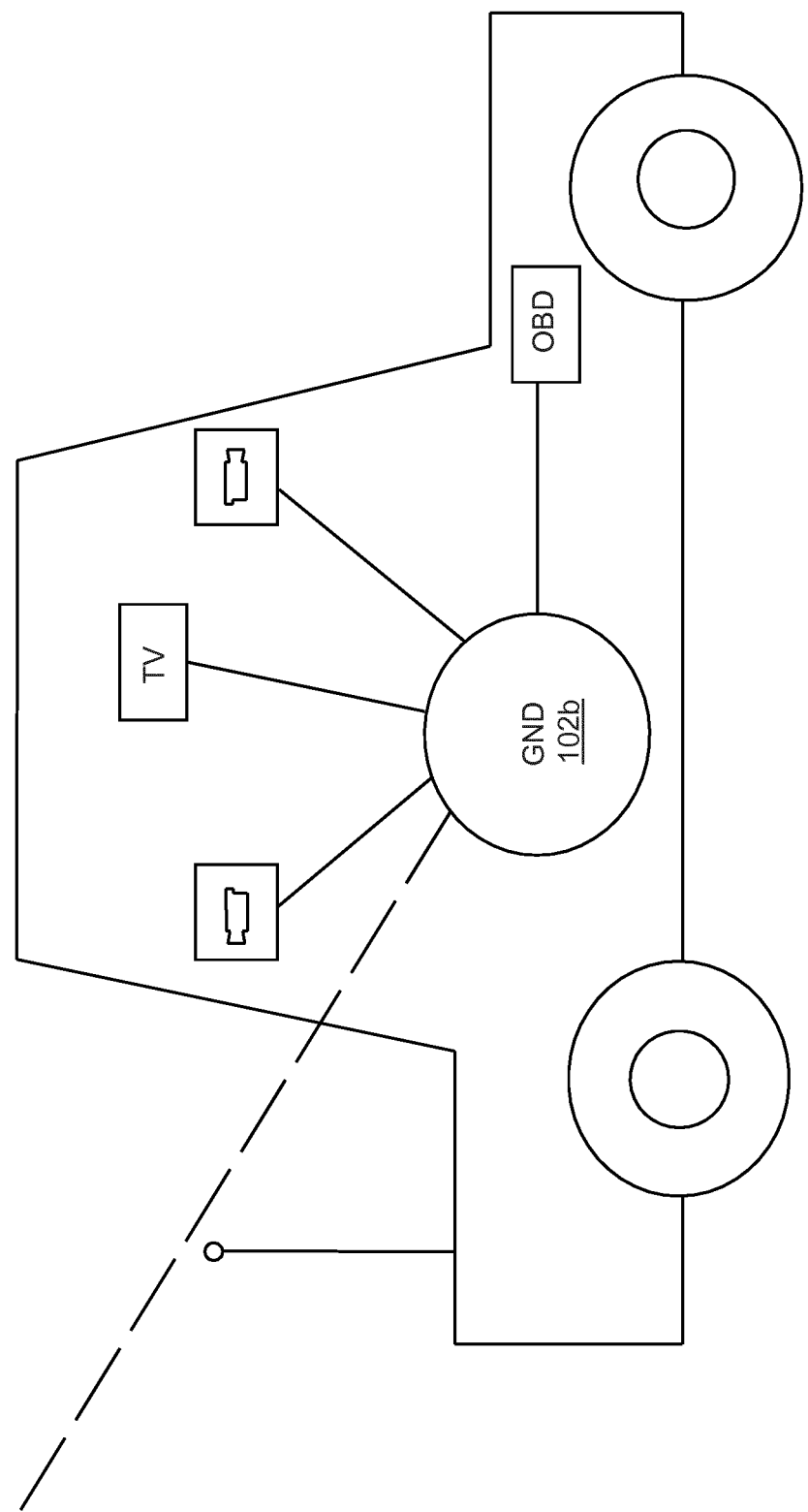
FIG. 1E is a schematic illustration of how a given group network device may be dynamically installed at a given local network, in accordance with an embodiment of the present disclosure.

In this regard, FIG. 1E is a schematic illustration of an example implementation where the local network of the group network device 102b is physically implemented on a vehicle, namely a car. For illustration purposes only, the network devices of this local network have been shown as two cameras, a TV and an On-Board Diagnostics (OBD) system of the vehicle.

These network devices can be employed for providing various services to the users A, B and C. As an example, images captured from a surrounding environment can be collected and processed to provide a safer traffic control. As another example, the cameras can also provide a safety feature when the vehicle is a taxi, for example, for both a driver and a passenger of the taxi. As yet another example, data collected from the OBD system can be processed for various purposes, for example, such as for providing emergency services, theft prevention, crash detection, crash prevention and the like.

The group network device 102b is communicably coupled to the server arrangement 104, via a wireless communication interface that is based on, for example, Wi-Fi®, Bluetooth®, Li-Fi and the like.

The service provided by the server arrangement 104 could allow the user B to monitor the vehicle remotely, for example, in a case when the vehicle is an automatic driverless vehicle. It will be appreciated that the vehicle could also be a drone.

FIGS. 1A, 1B, 1C, 1D and 1E are merely examples, which should not unduly limit the scope of the claims herein. It is to be understood that the specific designation for the network environment is provided as an example and is not to be construed as limiting the network environment to specific numbers, types, or arrangements of server arrangements, group network devices and network devices. A person skilled in the art will recognize many variations, alternatives, and modifications of embodiments of the present disclosure.

It will be appreciated that even if, in FIGS. 1A, 1B, 1C, 1D and 1E, the group network devices are depicted as multi-point devices (namely, having multiple network devices as end-point devices in their local network), they could also be implemented as single-point devices, namely having only one network device as an end-point device in their local network.

Figure 2:
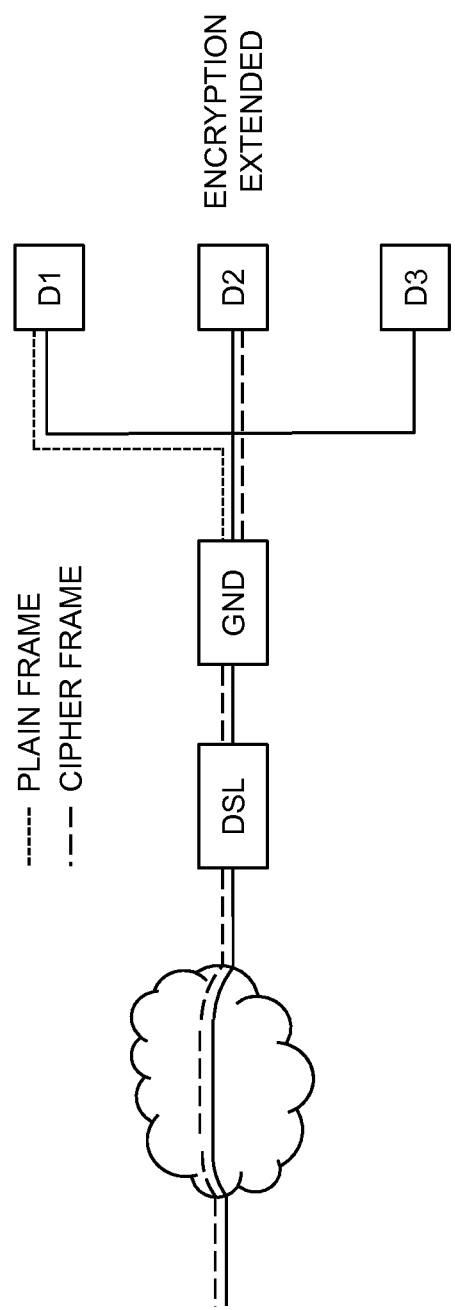
FIG. 2 is a schematic illustration of how a group network device can extend data protection to a specific end-point, namely a specific network device of a group network, according to an embodiment of the present disclosure.

FIG. 2 is a schematic illustration of how a group network device can extend data protection to a specific end-point, namely a specific network device of a group network, according to an embodiment of the present disclosure.

In FIG. 2, the group network device (depicted as 'GND') is associated with a local network comprising three network devices (depicted as 'D1', 'D2' and 'D3'). The group network comprises a plurality of network devices, from which only two network devices 'D1' and 'D2' belong to the local network to which the group network device 'GND' is associated. With respect to the group network (that has been partially depicted in FIG. 2), the network devices 'D1' and 'D2' are end-point devices that are served by the group network device 'GND'.

The network device 'D2' is provided with encryption/decryption keys to be used for encryption/decryption purposes. When a cipher frame is received by the group network device 'GND', the group network device 'GND' relays it to the network device 'D2' in an encrypted form. However, for the network device 'D1', the group network device 'GND' decrypts the cipher frame into a plain frame, and forwards the plain frame to the network device 'D1'.

In this way, some functionalities of the group network device 'GND' could also be optionally implemented in at least one of the end-point devices. In the illustrated example, an encryption/decryption functionality of the group network device 'GND' has been implemented in the network device 'D2'. In such a case, the group network device 'GND' delivers the cipher frame (namely, encrypted data) to the network device 'D2' without any need for decrypting it at the group network device 'GND', because the network device 'D2' can itself decrypt the cipher frame. Moreover, in such a case, the network device 'D2' also encrypts data before delivering it to the group network device 'GND' for relaying purposes, namely for relaying the data to other members of the group network.

FIG. 2 is merely an example, which should not unduly limit the scope of the claims herein. It is to be understood that the specific designation for the group network and the local network is provided as an example and is not to be construed as limiting the group network or the local network to specific numbers or types of network devices and group network devices. A person skilled in the art will recognize many variations, alternatives, and modifications of embodiments of the present disclosure.

Referring next to FIG. 3, there is provided a flow chart depicting steps of a method of creating a group network between network devices belonging to one or more local networks, in accordance with an embodiment of the present disclosure. The method is depicted as a collection of steps in a logical flow diagram, which represents a sequence of steps that can be implemented in hardware, software, or a combination thereof, for example as aforementioned.

The method is implemented via a system comprising a server arrangement that is communicably coupled to one or more group network devices associated with the one or more local networks. Each local network has its own group network device. A given group network device is dynamically installed at a given local network.

At a step 302, the one or more group network devices are employed to discover network devices connected to their corresponding local networks.

At a step 304, information indicative of a plurality of network devices discovered by the one or more group network devices or selected by a user from amongst the discovered network devices for creation of a given group network is received at the server arrangement.

At a step 306, the plurality of network devices are assigned to the given group network. In accordance with the step 306, the plurality of network devices are defined as members of the given group network.

At a step 308, the one or more group network devices are employed to automatically perform network configurations for the plurality of network devices, regardless of whether the members of the given group network are connected to a same physical local network or to different geographically-separated physical local networks. The given group network so created enables the members of the given group network to communicate and interoperate with each other in their native protocols.

The given group network supports different types of transmission paths and/or different transmission protocols defined by the transmission paths. As an example, with reference to FIGS. 1A and 1B, the group network depicted therein supports different transmission protocols, for example, such as 4G, 5G and Bluetooth®.

The steps 302, 304, 306 and 308 are only illustrative and other alternatives can also be provided where one or more steps are added without departing from the scope of the claims herein.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "one or more" is to be construed in a likewise manner.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

We claim:

1. A system for creating a group network between network devices belonging to one or more local networks, wherein the system comprises a server arrangement that is communicably coupled to one or more group network devices associated with the one or more local networks, wherein a local network of the one or more local networks is associated with a respective group network device of the one or more group network devices and a given group network device of the one or more group network devices is dynamically installed at a given local network of the one or more local networks, and wherein the server arrangement is configured to:
   (i) employ the one or more group network devices to discover network devices connected to each given local network of the one or more local networks;
   (ii) receive information indicative of a plurality of network devices discovered by the one or more group network devices or selected by a user from among the discovered network devices for creation of a given group network;
   (iii) assign the plurality of network devices to the given group network, and define the plurality of network devices as members of the given group network; and
   (iv) employ the one or more group network devices to automatically perform network configurations for the plurality of network devices, the members of the given group network being connected to a same physical local network or to different geographically-separated physical local networks, thereby creating the given group network for enabling the members of the given group network to communicate and interoperate with each other using native protocols, wherein the given group network supports different types of transmission paths and/or different transmission protocols defined by the transmission paths, further wherein a given group network device of the one or more group network devices is configured to:
     calculate an Internet Protocol (IP) network or subnetwork address configuration based upon a total number of the plurality of network devices discovered on a given local network in winch the given group network device of the one or more group network devices is dynamically installed;

assign an IP address, a subnet mask and a gateway to each of the plurality of network devices discovered on the given local network, based upon the calculated IP network or subnetwork address configuration; and configure each of the plurality of network devices discovered on the given local network basked on the assigned IP address, the subnet mask and the gateway.

2. The system of claim 1, wherein the server arrangement is configured to provide the user with an interactive user interface to enable the user to select the plurality of network devices from among the discovered network devices.

3. The system of claim 2, wherein the server arrangement is configured to:

enable, via the interactive user interface, the user to select, from among the discovered network devices, at least one network device for addition to the given group network;

assign the at least one network device to the given group network and re-define the members of the given group network, based upon the selection of the user; and employ the one or more group network devices to automatically perform network reconfiguration for remaining members of the given group network, thereby modifying the given group network for providing uninterrupted communication between the members of the given group network.

4. The system of claim 2, wherein the server arrangement is configured to:

enable, via the interactive user interface, the user to select, from among the plurality of network devices of the given group network, at least one network device for removal from the given group network;

remove the at least one network device from the given group network and re-define the members of the given group network based upon the selection of the user; and employ the one or more group network devices to automatically perform network reconfiguration for all the members of the given group network, thereby modifying the given group network for providing uninterrupted communication between the members of the given group network.

5. The system of claim 2, wherein the server arrangement is configured to:

employ the one or more group network devices to detect a possibly compromised or malfunctioning network device within the given group network; and indicate to the user, via the interactive user interface, the possibly compromised or malfunctioning network device, while providing an option to the user to remove the possibly compromised or malfunctioning network device from the given group network, thereby enabling the user to isolate other network devices of the given group network from the possibly compromised or malfunctioning network device.

6. The system of claim 1, wherein the server arrangement is configured to:

assign unique networking addresses to all the network devices;

automatically create a network configuration using the unique networking addresses; and communicate the created network configuration to the one or more group network devices for creating and/or modifying the given group network.

7. The system of claim 1, wherein the one or more group network devices are configured to encrypt all data produced within the given group network.

8. The system of claim 1, wherein a given network device exists in only one group network at a given point of time.

9. The system of claim 1, wherein a given network device exists in more than one group network at a given point of time.

10. The system of claim 1, wherein the server arrangement is configured to enable the user to create and manage a plurality of group networks of network devices.

11. The system of claim 10, wherein the server arrangement is configured to store network information pertaining to the plurality of group networks and their corresponding members.

12. The system of claim 10, wherein the one or more group network devices are configured to maintain routing tables for the plurality of group networks, wherein a given group network device is configured to maintain routing tables for only those group networks to which network devices discovered on its local network belong.

13. The system of claim 10, wherein the server arrangement acts as a centralized node that stores all group-specific routing tables, wherein the server arrangement is implemented as a router and is configured to transmit data to only those group network devices that ought to receive the data.

14. The system of claim 1, wherein the given group network is created by implementing a virtual data link layer (OSI L2) over an existing physical layer (OSI L1).

15. A method of creating a group network between network devices belonging to one or more local networks, wherein the method is implemented via a system comprising a server arrangement that is communicably coupled to one or more group network devices associated with the one or more local networks, wherein a local network of the one or more local networks is associated with a respective group network device of the one or more group network devices and a given group network device of the one or more group network devices is dynamically installed at a given local network of the one or more local networks, and wherein the method comprises:

(i) employing the one or more group network devices to discover network devices connected to each given local network of the one or more local networks;

(ii) receiving information indicative of a plurality of network devices discovered by the one or more group network devices or selected by a user from among the discovered network devices for creation of a given group network;

(iii) assigning the plurality of network devices to the given group network, and defining the plurality of network devices as members of the given group network; and (iv) employing the one or more group network devices to automatically perform network configurations for the plurality of network devices, the members of the given group network being connected to a same physical local network or to different geographically-separated physical local networks, thereby creating the given group network for enabling the members of the given group network to communicate and interoperate with each other using native protocols, wherein the given group network supports different types of transmission paths and/or different transmission protocols defined by the transmission paths, further wherein the method further comprises:

calculating an Internet Protocol (IP) network or subnetwork address configuration based upon a total number of the plurality of network devices discovered on a given local network in which the given group network device of the one or more group network devices is dynamically installed;

assigning an IP address, a subnet mask and a gateway to each of the plurality of network devices discovered on the given local network, based upon the calculated IP network or subnetwork address configuration; and configuring each of the plurality of network devices discovered on the given local network based on the assigned IP address, the subnet mask and the gateway.

16. The method of claim 15, further comprising providing the user with an interactive user interface to enable the user to select the plurality of network devices from among the discovered network devices.

17. The method of claim 16, further comprising:

enabling, via the interactive user interface, the user to select, from among the discovered network devices, at least one network device for addition to the given group network;

assigning the at least one network device to the given group network and re-defining the members of the given group network, based upon the selection of the user; and employing the one or more group network devices to automatically perform network reconfiguration for remaining members of the given group network, thereby modifying the given group network for providing uninterrupted communication between the members of the given group network.

18. The method of claim 16, further comprising:

enabling, via the interactive user interface, the user to select, from among the plurality of network devices of the given group network, at least one network device for removal from the given group network;

removing the at least one network device from the given group network and re-defining members of the given group network, based upon the selection of the user; and employing the one or more group network devices to automatically perform network reconfiguration for all members of the given group network, thereby modifying the given group network for providing uninterrupted communication between the members of the given group network.

19. The method of claim 16, further comprising:

employing the one or more group network devices to detect a possibly compromised or malfunctioning network device within the given group network; and indicating to the user, via the interactive user interface, the possibly compromised or malfunctioning network device, while providing an option to the user to remove the possibly compromised or malfunctioning network device from the given group network, thereby enabling the user to isolate other network devices of the given group network from the possibly compromised or malfunctioning network device.

20. The method of claim 15, further comprising:

assigning unique networking addresses to all the network devices;

automatically creating a network configuration using the unique networking addresses; and communicating the created network configuration to the one or more group network devices for creating and/or modifying the given group network.

21. The method of claim 15, further comprising configuring the one or more group network devices to encrypt all data produced within the given group network.

22. The method of claim 15, further comprising enabling the user to create and manage a plurality of group networks of network devices.

23. The method of claim 22, further comprising storing network information pertaining to the plurality of group networks and corresponding members of the plurality of group networks.

24. The method of claim 22, further comprising configuring the one or more group network devices to maintain routing tables for the plurality of group networks, wherein a given group network device is configured to maintain routing tables for only those group networks to which network devices discovered on the given local network belong.

25. The method of claim 22, wherein the server arrangement acts as a centralized node and is implemented as a router, and the method further comprises:

storing, at the centralized node, all group-specific routing tables; and transmitting data to only those group network devices that ought to receive the data.

26. A computer program product comprising a non-transitory computer-readable storage medium having computer-readable instructions stored thereon, the computer-readable instructions being executable by a computerized device comprising processing hardware to execute a method as claimed in claim 15.

* * * * *